Dec. 23, 1958 G. A. DE MATTIA ET AL 2,865,051
APPARATUS FOR INJECTION MOLDING PLASTIC ARTICLES
Filed July 19, 1957 6 Sheets-Sheet 1
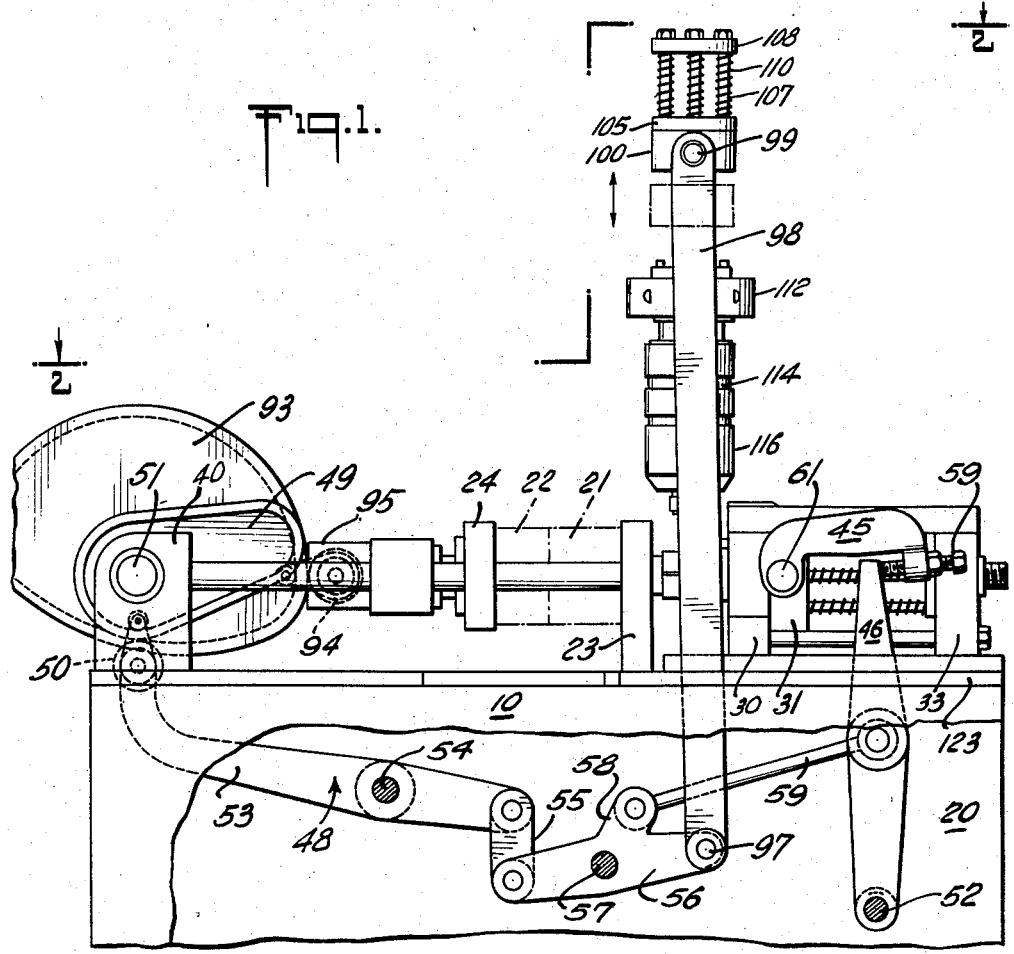
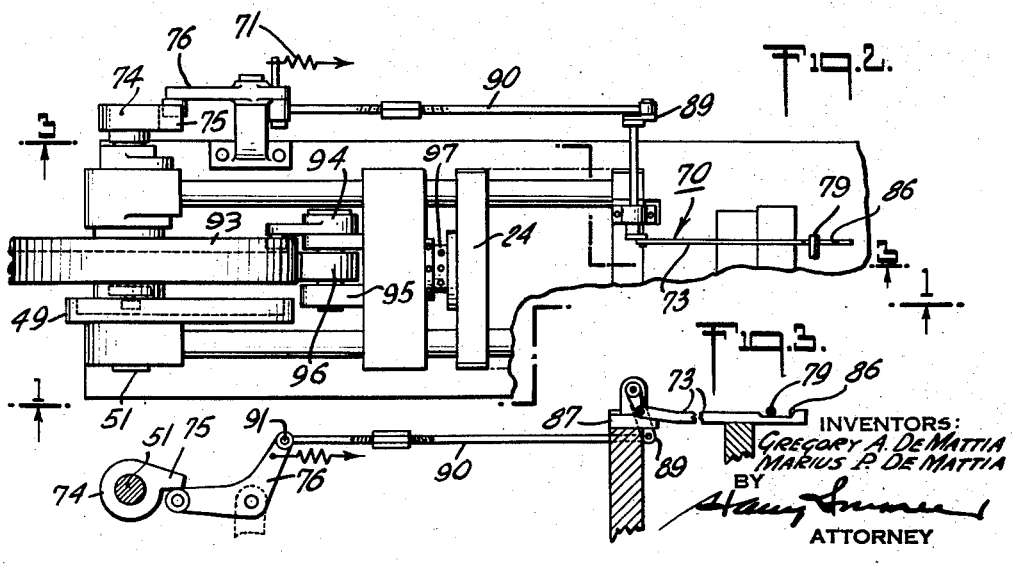
INVENTORS:
GREGORY A. DE MATTIA
MARIUS P. DE MATTIA
BY
ATTORNEY

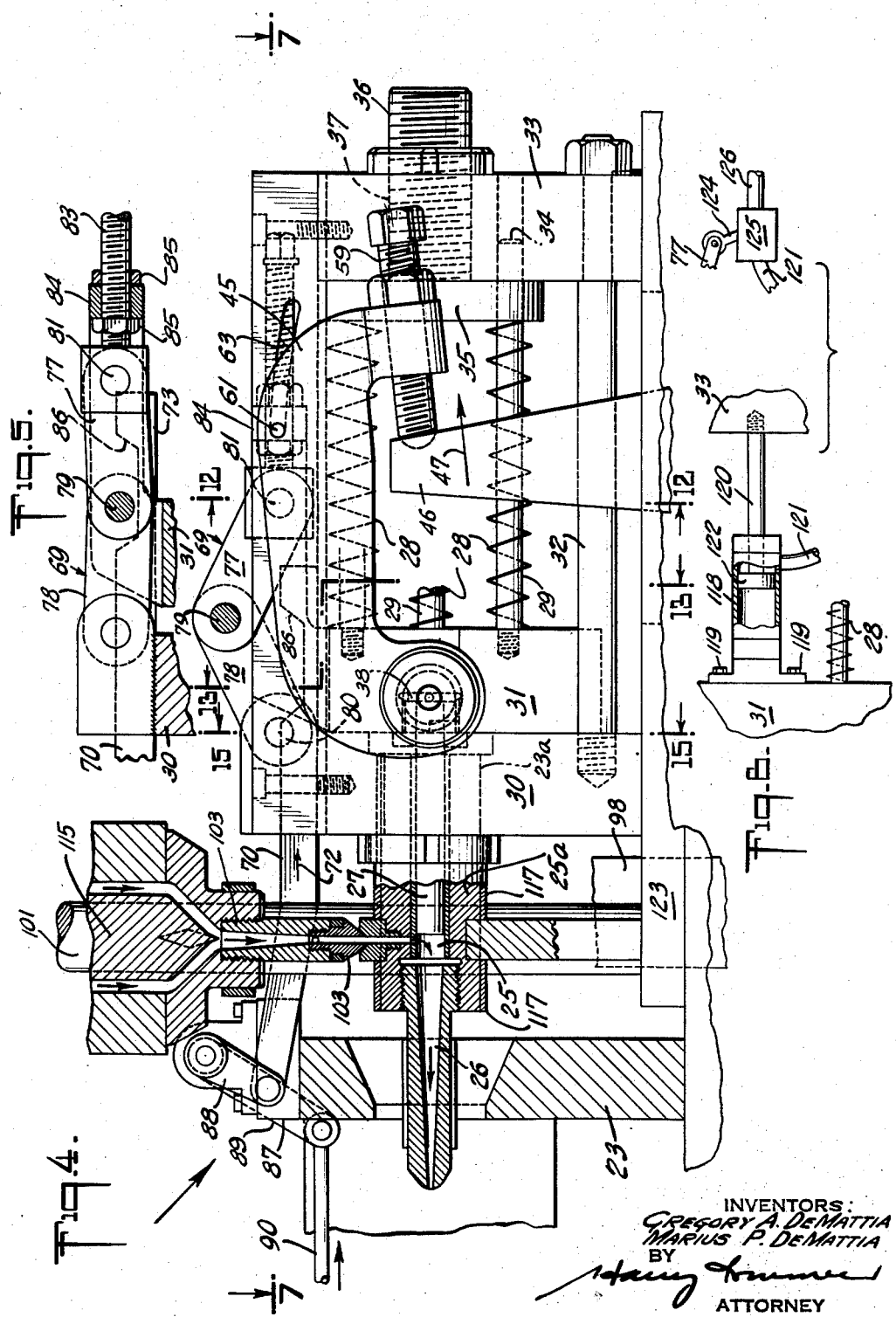

Dec. 23, 1958    G. A. DE MATTIA ET AL    2,865,051
APPARATUS FOR INJECTION MOLDING PLASTIC ARTICLES
Filed July 19, 1957    6 Sheets-Sheet 3
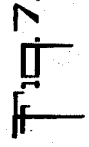
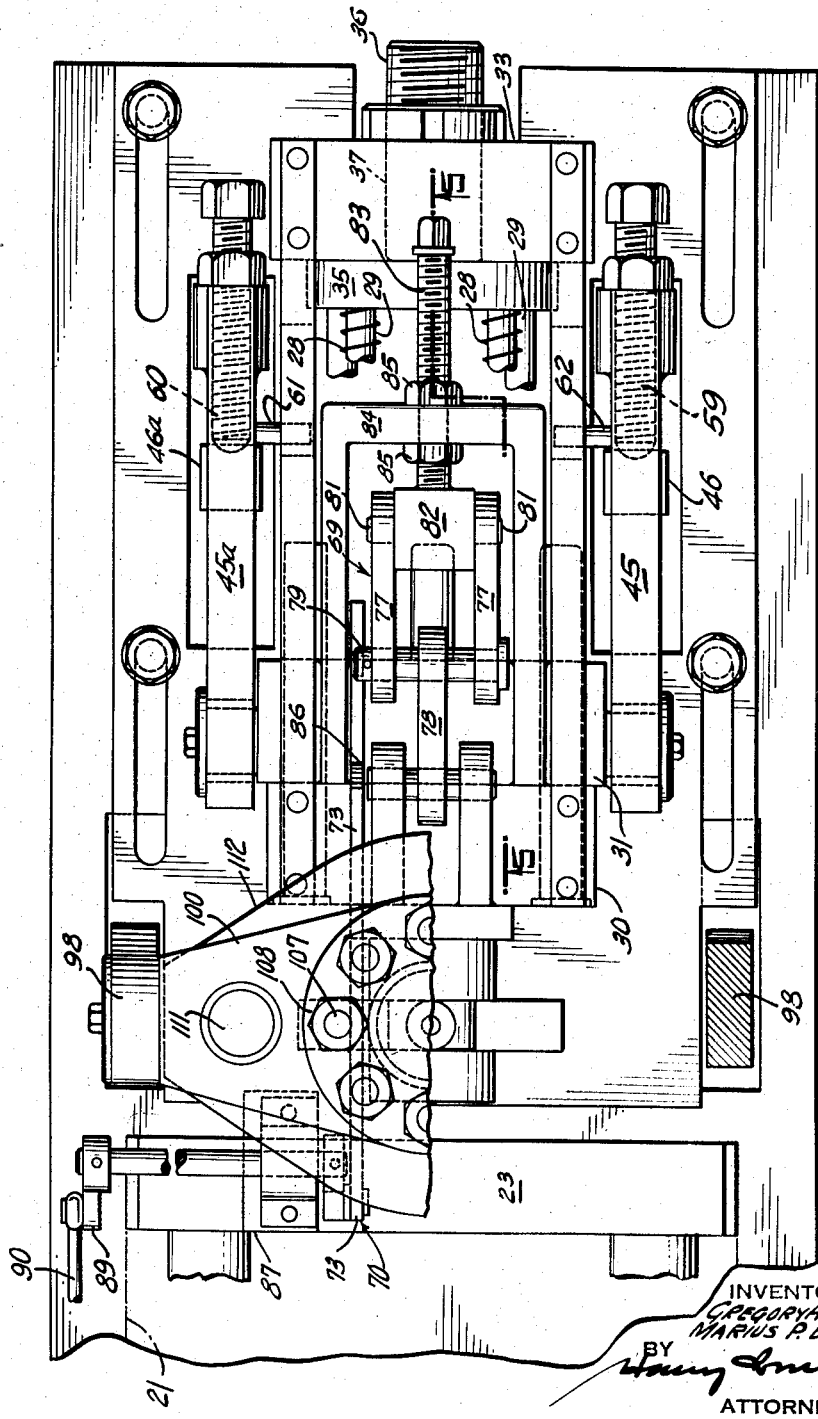
INVENTORS:
GREGORY A. DE MATTIA
MARIUS P. DE MATTIA
BY
ATTORNEY

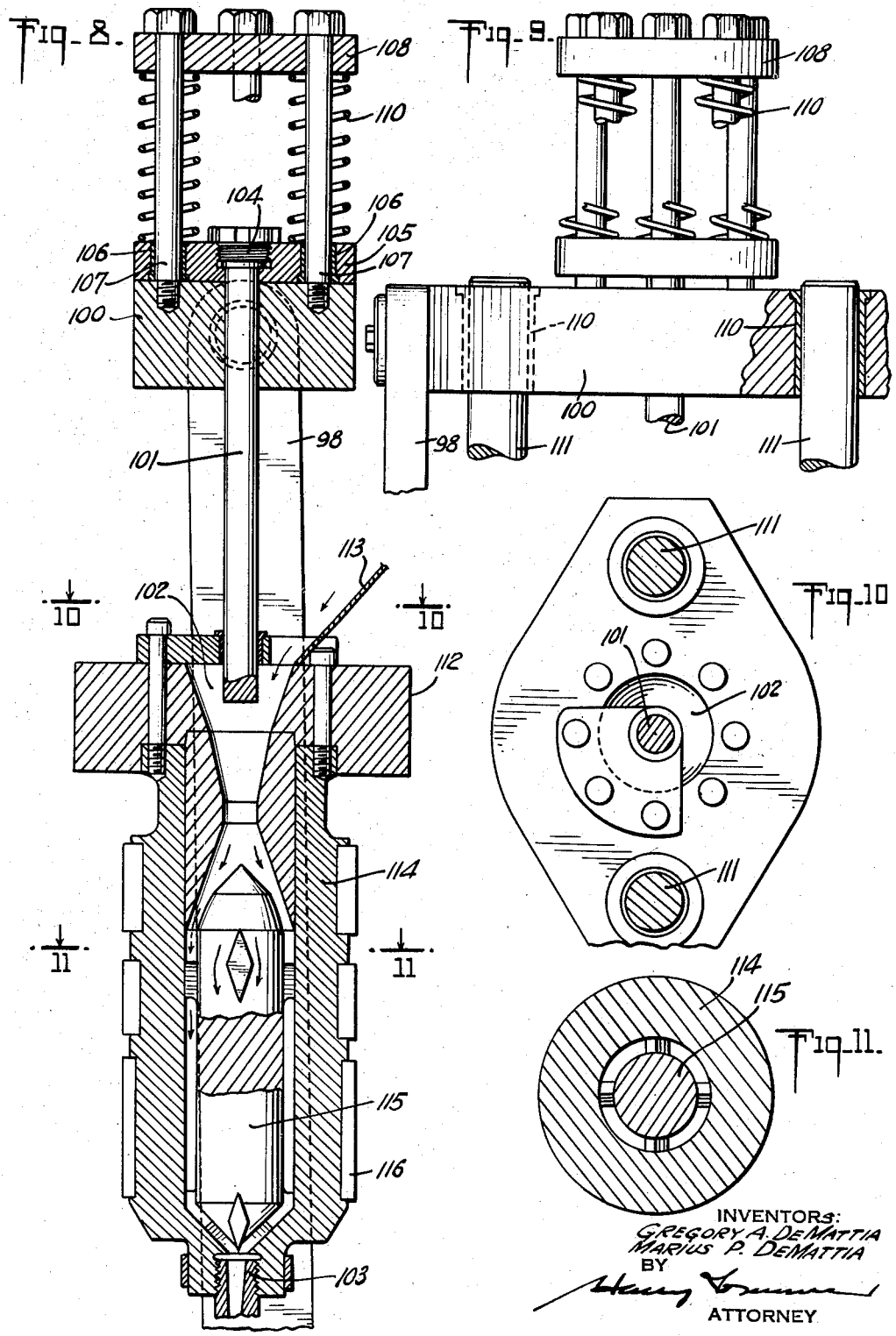

Dec. 23, 1958 G. A. DE MATTIA ET AL 2,865,051
APPARATUS FOR INJECTION MOLDING PLASTIC ARTICLES
Filed July 19, 1957 6 Sheets-Sheet 5
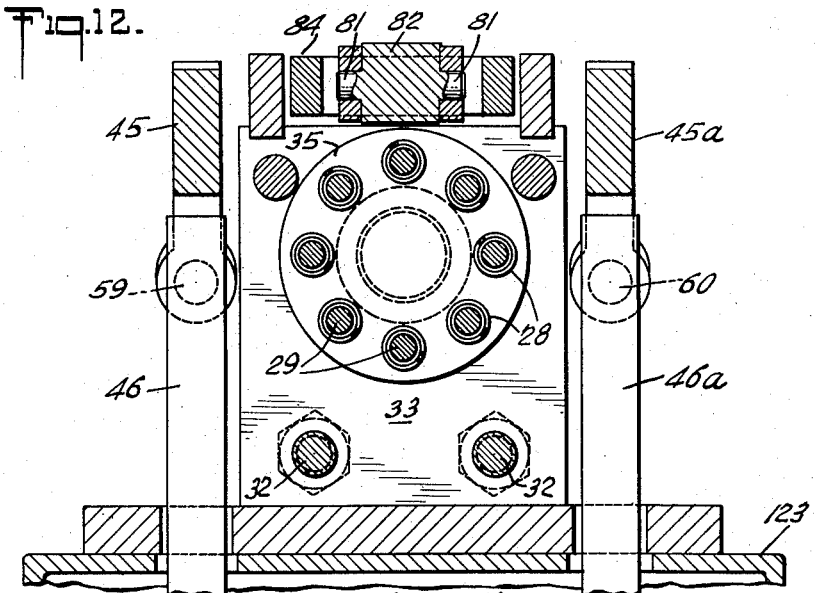
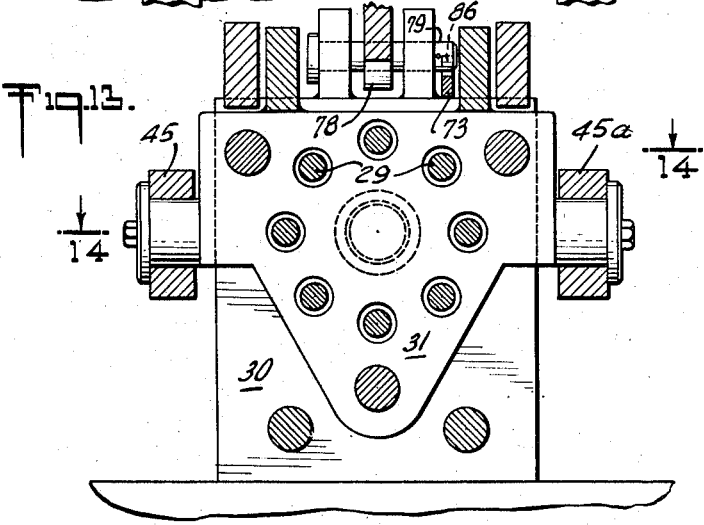
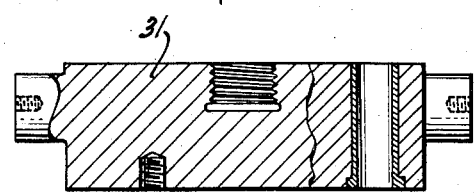
INVENTORS:
GREGORY A. DE MATTIA
MARIUS P. DE MATTIA
BY
ATTORNEY Dec. 23, 1958   G. A. DE MATTIA ET AL   2,865,051
APPARATUS FOR INJECTION MOLDING PLASTIC ARTICLES
Filed July 19, 1957   6 Sheets-Sheet 6
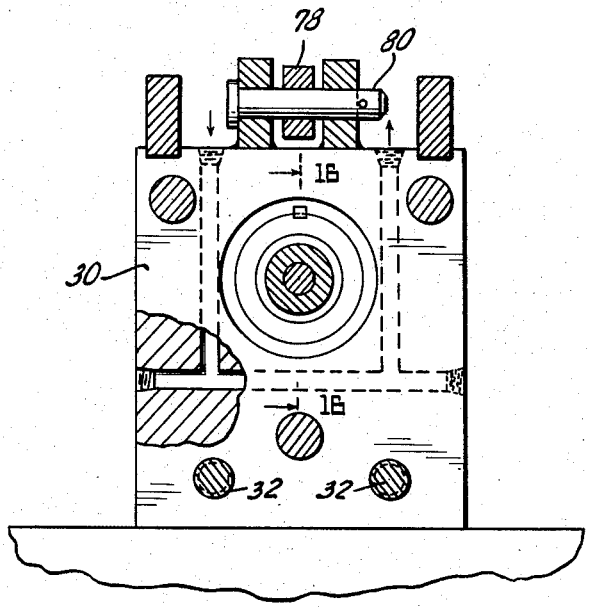
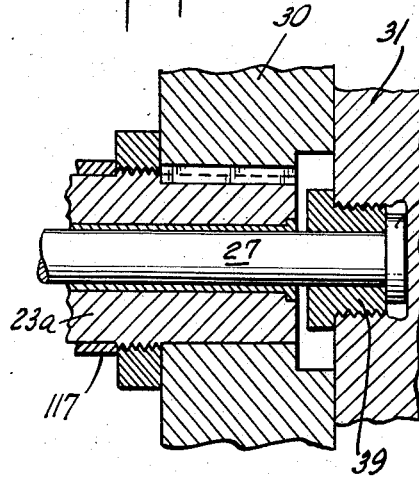
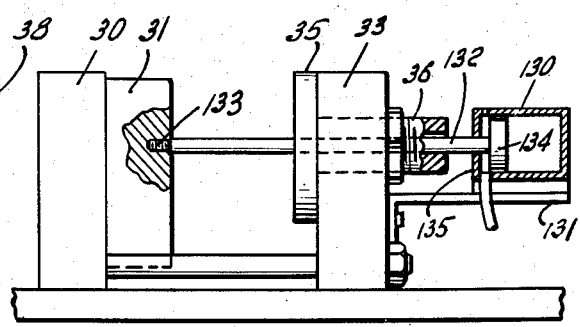
INVENTORS:
GREGORY A. DEMATTIA
MARIUS P. DEMATTIA
BY
ATTORNEY

United States Patent Office 2,865,051
Patented Dec. 23, 1958

2,865,051

APPARATUS FOR INJECTION MOLDING PLASTIC ARTICLES

Gregory A. de Mattia, Nutley, and Marius P. de Mattia, Passaic, N. J.

Application July 19, 1957, Serial No. 672,920

9 Claims. (Cl. 18—30)

Many articles, presently made of paper and other materials, would be more desirable and useful if made of plastic materials, but they cannot be practically and commercially molded with the use of methods and apparatus presently available in the industry. Such articles may now, pursuant to the procedure of this invention, be efficiently commercially made of plastic materials.

The cost of the apparatus embodying the invention is only a fraction of that of standard types of molding apparatus which might be tried for but would not be satisfactory for such use; and the cycling of the apparatus of the invention may be set for a very high order, making it highly efficient and economical in operation.

Examples of practical procedures embodying the invention are described below and in the accompanying drawings; the invention is not limited thereto; but covers all other forms coming within the scope or purview of the disclosure herein.

In the drawings:

Fig. 1 is a side elevational, partly fragmentary view of a machine embodying the invention, taken on line 1—1 of Fig. 2, Fig. 2 is a fragmentary top plan view thereof, taken at line 2—2 of Fig. 1, parts being omitted for the sake of clarity, Fig. 3 is a fragmentary elevational view of a form of tripping mechanism which may be used in carrying out the invention, taken on line 3—3 of Fig. 2, Fig. 4 is a fragmentary, elevational, partly sectional view of the machine, showing the plunger-cocking mechanism in released position, Fig. 5 is an elevational, partly sectional view, showing the plunger-cocking mechanism in latched position, taken on line 5—5 of Fig. 7, Fig. 6 is a fragmentary, schematic view showing another form of plunger and tension means retracting mechanism which may be used in carrying out the invention, Fig. 7 is a partly fragmentary, top plan view, taken on line 7—7 of Fig. 4, Fig. 8 is a vertical sectional, partly elevational view of a form of feeding mechanism which may be used in carrying out the invention, Fig. 9 is a fragmentary elevational view thereof, showing an automatic adjustment of the parts on occurrence of an excessive pressure condition, in a form of mechanism useful in connection with the invention, Fig. 10 is a fragmentary, horizontal sectional view, taken on line 10—10 of Fig. 8, Fig. 11 is a horizontal sectional view, taken at line 11—11 of Fig. 8, Fig. 12 is a fragmentary, vertical sectional view taken on line 12—12 of Fig. 4, Fig. 13 is a similar view taken on line 13—13 of Fig. 4, Fig. 14 is a horizontal sectional view taken on line 14—14 of Fig. 13, Fig. 15 is a vertical, partly fragmentary, sectional view taken on line 15—15 of Fig. 4, Fig. 16 is a fragmentary longitudinal sectional view taken on line 16—16 of Fig. 15, and Fig. 17 is a side elevational, partly fragmentary view of an arresting member which may be used in carrying out the invention.

The invention provides molding procedures adapted for use in a machine 20 (Fig. 1) having molds 21, 22, material being fed from a chamber 25 (Fig. 4) through a nozzle 26 and thence into the molds, responsive to movement of plunger 27 pursuant to the invention. The plunger 27 is first moved to a position spaced from the molds against the resistance of a plurality of springs which may be tension springs, as shown at 28, Fig. 4, which tend to lengthen or compression springs, which tend to shorten, which are moved to a position of tension (the term "tension" as used herein shall be deemed to include compression of compression springs) on exertion of suitable force, and held in such position for trip release of the thus accumulated inertia at the time desired.

In the form shown in Fig. 4, the springs 28 are positioned upon guide rods 29 secured, at one end, to a slide plate 31 which slides on guide rods 32 secured at one end to the standard 30 and at the other end to an end standard 33, the guide rods 29 having free ends 34 passing through apertures in the end standard 33 after passing through apertures in a disc 35 held against said standard 33 by the springs 28. An adjusting screw 36 is movable in threaded portion 37 of the end standard 33 to adjust the position of the disc 35 relative to the standard 30, thereby adjusting the tension of the springs 28.

The end 38 of the plunger 27 (Fig. 16) is secured to the slide plate 31, to move in unison therewith, by any suitable means, such as shown at 39 in Fig. 16.

Pursuant to the invention, the plunger is moved in the chamber 25 from a position adjacent (Fig. 4) to a position away from the molds against the tension of the springs 28, and cocked in that position until released by suitable means.

The slide plate retracting and latching means may be of a convenient type such as shown in the drawings, wherein arm member 46 (Figs. 1, 4 and 7) is shown moved in the direction of arrow 47 (Fig. 4) by suitable means such as a linkage 48 (Fig. 1) actuated by the cam 49 and cam follower 50 secured to said linkage 48 and engaging the cam 49. There may be a pair of arm members 46, 46a Fig. 7 and a linkage train 48 operating on a cam 49 keyed to shaft 51 for each of such arms; that shown in Fig. 1 for arm 46 will suffice for both. The cam 49 is keyed to the shaft 51 which is journalled in suitable bearings 40 and rotated by a motor or other drive source (not shown). In the form shown in Fig. 1, the arm member 46 is pivoted as at 52 on the machine 20 on which the arm 53 of the linkage 48 is pivoted as at 54 for connection, as at 55, with a bell crank 56 pivoted to the machine as at 57, said bell crank having an arm 58 connected by rod 59 with arm 46.

Any other desired or convenient means for retracting the slide plate 31 and thereby the plunger against the tension of springs 28 may be used within the scope and purview of the invention. A convenient means shown in the drawings, includes arms 45, 45a (Figs. 1, 4 and 7) pivoted as at 61 to the slide plate 31, adjusting screws 59, 60 threaded through the opposite free ends of said arms 45, 45a being adapted to bear against the upper ends of the arm members 46, 46a. Said arm members 45, 45a may be provided with guide means such as pins 62 (Fig. 7) moving in arcuate slots such as 63 shown in Fig. 4, said slots being drawn on a radius from point 52 (Fig. 1). A toggle linkage 69 (Fig. 5) is provided in an arrangement such that, when the slide plate 31 (and therefore the plunger 27) is retracted against the tension of members 28 to the desired degree the toggle links 77, 78 will drop to a straight position, thus latching the parts with the springs compressed against release until the toggle is stripped on engagement of the inclined surface 86 of trip bar 70 with the pin 79 of linkage 69. Trip bar 70 (Figs. 4, 5 and 2) is normally urged by spring 71 (Figs. 2 and 5) out of engagement with the toggle 69 and is moved into engagement against said spring tension by the cam 74 keyed to shaft 51. Bell crank 76 (Figs. 2 and 3) is connected, at 91, with the trip bar 70, and has the free end thereof positioned in the path of rotation of the nosing 75 of cam 74.

During each cycle of rotation of the shaft 51, the slide plate 31 and plunger 27 will be retracted against the tension of the springs 28 and cocked in that position, by latch linkage 69, and then released when the inclined surface 86 of the trip bar 73 engages the toggle member 69. The drawings illustrate, by way of example, a practical form of toggle 69, trip bar 73 and linkage 70 which may obviously be varied. Toggle 69 comprises a pair of links 77, 78 connected by the pin 79, link 78 being pivotally connected as at 80 (Fig. 4) to the fixed standard 30, and the link 77 (there may be a pair of links 77, Fig. 7) being connected as at 81 to a bearing block 82 having an integral externally threaded rod 83 (Fig. 7) extending therefrom. Said rod 83 may be connected, as by the nut members 85, to the frame 84 (Fig. 5) which in turn is unitary with or rigidly secured to the movable plate 31.

It will be apparent, from an examination of Fig. 4, that, upon the movement of the arm member 46 and thus arm member 45, in the direction of the arrow 47, slide plate 31 and plunger 27 will be retracted from the molds, and linkage 69 will drop from the (broken) position thereof shown in Fig. 4 to the (latching straight line) position shown in Fig. 5 (the position may be slightly downwardly bowed in Fig. 5). The slide plate 31 and the plunger 27 are thus held in cocked position.

The arm members 46, 46a next are moved away from the adjusting screws 59, 60 of the arms 45, 45a due to the contour of the cam 49 and resultant movement of the engaging linkage 48. Cam 74 (Fig. 2) rotates the bell crank 76 against the spring 71 whereupon the trip bar 73 is moved toward the standard 30 so that the inclined surface 86 of said trip bar is moved into engagement with the center pin 79 of the toggle 69, camming the pin upwardly and thereupon the toggle 69 is broken from its straight line latching position, Fig. 5, to its open or contracted position, Fig. 4. The latter position enables the slide plate 31 to shoot forward instantaneously responsive to the built up inertia of the tension members 28, so that the plunger 27 will project the plastic material in the chamber 25 instantaneously through the nozzle 26 and into the molds. The operation above described is repeated as the power shaft 51 continues to rotate.

Suitable means may be provided for adjusting the degree of retraction of the slide plate 31 and plunger 27, such as the adjusting screws 59, 60 on the arm members 45 and 45a (Fig. 7) and the nut members 85 (Fig. 5) engaging the rod 83 and the block 82. The location of the latch member 73 relative to the pin 79 may be adjusted by providing an adjustable base 87 in linkage 70, Fig. 3, which may be suitably longitudinally adjustably mounted on the standard 23. Base 87 may also be vertically adjustable on said standard 23 by suitable adjusting means. The linkage 70 for the toggle trip bar 73 may, as shown in Figs. 4 and 7, be connected as by a link 88 keyed to link 89, which, in turn, may be connected by the rod 90, Figs. 2 and 4 pivotally as at 91 to one end of the bell crank 76. It will be appreciated, from this example of a practical linkage means suitable for the purpose, that numerous other connecting means may be substituted therefor within the scope and purview of the invention.

Mold 22 may be moved relative to the fixed mold 21 to thus open and close the molds, responsive to the cam 93 (Figs. 1 and 2) keyed to the shaft 51 engaged by the cam follower 94 journalled in a block 95 also having a roller 96 (Fig. 2), freely rotatably mounted therein. The cam 93 circumferentially engages roller 96 of block 95. Block 95 may be suitably secured, as by coupling 97 to the member 24 to which the mold 22 is secured.

In carrying out the invention, a mechanism for feeding the plastic material into the molding machine 20 may be connected to the above described linkage 48 as at 97 (Fig. 1). Said feeding mechanism may include the vertical rod or rods 98 secured at 97 at one end to linkage 48 and secured at the opposite end 99 (Fig. 8) to a plate 100. Vertical rod 101 reciprocates in the vertical feed chamber 102 whose vertical nozzle 103 is (Fig. 4) secured to the main chamber 25 of machine 20, for feeding the plastic material through the nozzle 26 and thence into the molds.

The structure shown in Figs. 8–11 prevents jamming of the mechanism or undue stress and strain being set up by virtue of any condition which might otherwise tend to block movement of the vertical feed rod 101 (Fig. 8). To that end the rod 101 may be secured as at 104, to a plate 105 having openings 106 through which freely pass the lower ends of rods 107, secured to plate 100, the upper end of rods 107 passing through an end plate 108, springs 110 being interposed between the plates 108 and 105. The rod (or rods 98) as above noted and shown in Fig. 1, is connected to the linkage 48 so that it will be reciprocated in timed sequence to the movements of the main plunger 27, as determined by the cam 49 actuating said linkage. If there is some impediment, for example, interiorly of the feed chamber 102, which prevents the rod 101 from returning to its normal lowermost position, said rod can stop short of its lowermost position, as indicated in Fig. 9, against the tension of the springs 110. When the condition which prevented the full return of the rod is remedied, said rod will be moved to its true (Fig. 8) position, by springs 110. This slight retraction of the rod against tension of the springs as shown in Fig. 9, does not affect or in any wise interfere with the reciprocating movement of the vertical rod 98 by the linkage mechanism 48, as will be apparent from a comparison of Figs. 8 and 9 from which it will be noted that plate 100 fixed to the vertical rod 98 moves to its true position without regard to whether plunger 104 is slightly separated therefrom (Fig. 9).

Plate 100 may be provided with a plurality of lined apertures 110 to freely receive the vertical supporting rods 111 which may be secured to the machine 20 in any desired or convenient manner. The feed chamber 102 may be formed in the plate 112 (Fig. 8) having a funnel 113 which may be connected to a plastic material feeding mechanism or through which said plastic material may be deposited into the feed chamber 102, passing thence through the chamber 114 having a spreader 115 and suitable heaters 116, said chamber opening into the nozzle 103 connecting the chamber 102 with the portion 23a, Fig. 16, of chamber 25 of the machine 20 (Fig. 4). In the position of the parts shown in Fig. 1, the toggle 69 has been broken, and the plunger 27 therefore instantaneously has shot forward in the chamber 25 and projected the plastic material through the nozzle 26 and into the molds 21, 22. The timing and actuating means such as the camming arrangement, are such that next the batch of material fed into the chamber 102 (Fig. 8) will have been moved through the vertical nozzle 103 and into the chamber 25 while the main plunger 27 is being retracted, preplasticizing the material and maintaining it in the chamber 25 compact, at the desired density and plasticized. The vertical plunger 101 is moved downwardly more rapidly than the retraction of the main plunger 27.

The above described cycling of the mechanism is predetermined by the cams 49, 93, 74, the linkage and toggle mechanisms 69 and the bar 73 above described; these or other parts for the same purpose are calculated to provide efficient and automatic cycling of the machine.

Downward pressure exerted by the vertical rod 101 is calculated to be substantially less than that for the main plunger rod 47, which moves instantaneously responsive to the built-up inertia of the springs 28 which are precalculated to be substantially heavier than the springs 110 and which are suddenly released whereas reciprocation of the vertical rod 101 is at a steady pace, under less pressure.

The means 46 for retracting the slide plate 31 may be other mechanical forms suited for retraction of slide plate 31 against the tension of the spring means 28, such as shown in Fig. 6 wherein the cylinder 118 is shown secured as at 119 to the slide plate 31 (instead of the arms 46, 45 of Fig. 4) and a rod 120 reciprocates in said cylinder responsive to a pressure medium introduced into said cylinder through a hose 121 which might be connected to a hydraulic or compressed air source (through a valve 125), for example, to impose pressure behind the head 122 of the plunger 120, thereby drawing the slide plate 31 against tension of springs 28 toward the end standard 33—the latter would be firmly anchored to the machine base 123 (Fig. 5) of the machine 20. In such case linkage 69 may (Fig. 6) be connected to lever 124 controlling valve 125 for releasing the latching member 118 so that slide plate 31 may be projected forwardly responsive to the built up inertia of springs 28 against which the slide plate 31 will have been retracted by mechanism 118 and held until released by valve 124—125. The slide plate 31 is held in retracted position by the liquid or gaseous medium maintained under pressure in cylinder 118 and against the plunger head 122 therein until released by suitable means operating on the control mechanism therefor, such as shown in Fig. 6 as a control lever 124 for valve mechanism 125 connected as at 126 with a source of pressure (not shown). The toggle 69 or other latching mechanism holds the control lever 124 in position to maintain the pressure in cylinder 118 until it is desired to release that pressure so that the main plunger 27 may be projected forwardly responsive to the spring pressure 28, at which time the control lever 124 is tripped. Exemplary of forms of mechanism suitable for the purpose, there is shown in Fig. 6 the link 77 of the toggle 69 connected directly to the valve member 124; trip bar 73 would trip the linkage 69 as in Fig. 5. If desired, a cushion mechanism may be provided to arrest the last moment of forward movement of slide plate 31 when released, to prevent the slide plate from impact with the standard 30. A mechanism suitable for thus arresting movement of slide plate 31 short of abutting contact with standard 30 is shown in Fig. 17, wherein a hydraulic or air cylinder 130 is mounted as at 131 on the standard 33 and the plunger 132 of said cylinder passes freely through the adjusting screw 36, standard 33 and disc 35 and is fixed as at 133 in the slide plate 31. The pressure medium in the cylinder 130 intermediate the head 134 of the rod 132 and the end 135 of the cylinder 130 will cushion or absorb the last moment of movement of the rod 132 of the slide plate 31 and hold it just short of contact with the standard 30. Cylinder 130 might be an empty cylinder provided with a small air vent between the head 134 and the end 135 of the cylinder. Suitable heaters 117 for chamber 25 in casing 25a may be provided (Figs. 4 and 16).

The invention enables a very fast ram cycle for the manufacture of thin plastic articles, at a very high rate of production in the number of shots per minute, and enabling the practical commercial molding of articles of lesser wall thickness than was feasible in molding apparatus heretofore.

We claim:

1. In an apparatus for forming thin-walled articles in the thin-walled cavities of plastic molds, of plastic material deposited in a chamber communicating with said mold, a plunger movably disposed in said chamber, means for imposing forces on the plunger urging the plunger toward the molds, means for moving the plunger in the chamber to a position away from the molds, against the force of said urging forces, latch means engaging the plunger to hold it in said position away from the molds, and means for disengaging the plunger latch means, releasing the plunger for movement, responsive to said urging forces, toward the molds from said position away from the molds, the plunger then instantaneously moving toward the molds under the full impact of the so-released forces exerted on the plunger and projecting the material from the chamber into said molds, thus completing a cycle of so forming said thin-walled articles, and means for automatically repeating said cycle.

2. In an apparatus as set forth in claim 1, said means for imposing forces on the plunger comprising tension means.

3. In an apparatus as set forth in claim 2, said tension means being springs.

4. In an apparatus as set forth in claim 2, a slide plate secured to said plunger, complementary means in said apparatus and slide plate for guiding the slide plate and thus the plunger in movement toward and away from the molds, said means for imposing forces engaging the slide plate and thus so imposing said forces on the plunger.

5. In an apparatus as set forth in claim 4, said latch means including a linkage connected to the slide plate and to the apparatus, said linkage, when the slide plate is so moved away from the molds, being in one position wherein the slide plate, and thereby the plunger, is latched in said one position, and said means disengaging the plunger latch means including a member movable into engagement with said linkage, to move the latter out of said one position.

6. In an apparatus as set forth in claim 1, said means for moving the plunger to a position away from the molds including a lever member pivotally mounted in the apparatus and engaging the plunger and cam actuated means engaging the lever member to selectively move the same into engagement with the plunger to so move the latter to a position away from the molds and to move the lever member away from the plunger so as not to impede movement of the plunger toward the molds.

7. In an apparatus as set forth in claim 1, said means for so depositing the plastic material in the chamber being disposed at an angle to the plane of the chamber, and being yieldable on the setting up of undue forces in said means for so depositing the material to avoid transferring said forces to said chamber.

8. In an apparatus as set forth in claim 1, means for so depositing the plastic material in the chamber relative to the means for moving the plunger in the chamber.

9. In an apparatus as set forth in claim 8, said means for so depositing the plastic material in the chamber including means for heating said plastic material prior to so depositing said plastic material in the chamber.

References Cited in the file of this patent

UNITED STATES PATENTS 2,380,882    Tucker _____ July 31, 1945
2,600,507    Leahy et al. _____ June 17, 1952